United States Patent Office 2,741,565
Patented Apr. 10, 1956

2,741,565

METHOD FOR FORMING A PROTECTIVE GLAZE ON A SURFACE

Roy A. Halversen, Dearborn, and John O. Parker, Niles, Mich., assignors to Parker Halversen Company, Niles, Mich., a corporation of Michigan No Drawing. Application November 1, 1951, Serial No. 254,451

16 Claims. (Cl. 117—54)

This invention relates to a method for surface treating a substance, particularly to a method for treating the surface of a high-melting substance to form thereon an adherent, continuous, protective deposit or glaze which effectively seals the surface and protects it from corrosion and, in many instances, renders it less catalytic than the unprotected surface. This application is a continuation-in-part of co-pending application Serial No. 10,666, filed February 25, 1948, and now abandoned.

In the co-pending application just referred to, there is described and claimed a method for depositing on the surface of a ceramic tube a thin glaze or layer characterized by its chemically resistant, highly impervious and non-catalytic nature. In the process described in the co-pending application the ceramic tube is heated, generally at a temperature of from about 2100° to about 2500° F. or higher, and elemental phosphorus is generally burned in the heated tube while a current of air or oxygen is passed through the tube. Under such conditions the phosphorus is converted to phosphorus pentoxide which contacts the inner heated tube surface and reacts therewith to form a tightly adherent, impervious, non-catalytic and chemically resistant glaze on the surface. Alternatively, a current of air or other gaseous carrier containing suspended phosphorus pentoxide can be passed slowly through the heated tube. The chemical identity of the glaze formed on the surface of the tube is not known with certainty, but it may consist of a very thin layer of a phosphate or pyrophosphate of a metal constituent of the ceramic composition formed by reaction between the highly heated phosphorus pentoxide and the components of the tube wall.

Combustion tubes treated in the manner described are of great value in analytical work involving the combustion of sulfur-containing ore, metal and other samples, since, which using such a treated tube, it is possible to recover all of the sulphur in the sample as sulphur dioxide. Because of the non-catalytic nature of the glaze there is no tendency for the sulphur dioxide to be oxidized to sulphur trioxide in the cooler regions of the tube by the accompanying oxygen as is the case in conventional unglazed combustion tubes. Furthermore, even highly porous tube walls are effectively sealed by the glaze, thus reducing to a negligible value the leakage and loss of gases through the tube wall. The advantages resulting from the availability of such tubes are apparent to those familiar with the art.

It has now been found, and is herein first described, that the process as previously applied to a ceramic tube is, sometimes with certain modifications, of much wider application and can be utilized for the formation of a tightly adherent, impervious, chemically resistant and non-catalytic glaze or deposit on the surface of a variety of substances herein referred to generically as "high-melting oxide-coated metals and wholly inorganic metal compounds."

The term "oxide-coated metal" as used herein includes those metals and alloys, such as aluminum, iron, copper, magnesium, zinc, and alloys thereof as well as many others, which normally acquire on their surface at least a thin coating of oxide upon exposure to air. This phenomenon is well known and understood and need not be dealt with in detail here. It is pointed out, however, that the term "oxide-coated metal" also includes metals and alloys which have been coated deliberately with a layer of oxide, e. g. by contact with heated air or oxygen, and which may or may not normally acquire such a coating upon exposure to air at ordinary temperatures. Examples of such metals and alloys which are thought to acquire such a coating either only slowly or not at all at ordinary temperatures are silver, nickel, stainless steel and the like. A description of the formation of an oxide coating on such metals as an integral part of one modification of the invention will be given later.

The term "high-melting substance" as used herein means, and is restricted to, a substance which does not melt below about 480° F. Many substances included, such as refractory and ceramic compositions referred to later, are often thought of as being infusible, or substantially so, except at extremely high temperatures.

The term "wholly inorganic metal compound" as used herein refers to metal oxides, carbides, salts and other metal-containing chemical compounds devoid of organic radicals and encompasses a wide variety of metal compounds including compounds of tungsten, titanium and other metal carbides, magnesia, alumina, lime and other metal oxides, complex silicates, blast furnace slag, refractory and ceramic compositions containing calcium or zirconium compounds, fired clay products and many others.

The process of the invention is carried out by contacting the heated surface of the high-melting oxide-coated metal or inorganic metal compound with phosphorus pentoxide vapor for a time sufficient to form a glaze on the surface of the high-melting substance. The actual amount of phosphorus pentoxide retained on the surface in combined form appears to be so small as to be substantially unmeasurable by ordinary analytical means. Although the thickness of the glaze formed on the surface has not been measured, it is generally so thin that the form of the surface is substantially unaltered except for the filling of minute pores in the surface. Larger pores and depressions are merely glazed on their entire inner surfaces without appreciable filling. It appears, also, that the glaze at the instant it is formed may be somewhat plastic in nature, depending to some extent upon the actual temperature employed, and that while in this state it flows to a certain extent and thus promotes the formation of a smooth, shiny, continuous deposit.

The contacting of the surface of the high-melting substance with phosphorus pentoxide vapor can be carried out in a number of ways. One method frequently employed in the case of tubular members which are to be glazed on the inside is to combust phosphorus inside the heated tube as mentioned previously while passing a gentle stream of air or oxygen through the tube. Vessels of other shapes can be treated in a somewhat similar manner. Alternatively, the article can be heated to the requisite temperature in an oven and a stream of air or other suitable gaseous carrier containing suspended phosphorus pentoxide passed through the oven so that all surfaces of the article are contacted by the pentoxide which exists principally in the vapor form at temperatures above about 480° F. The article is subsequently cooled after which it can be washed with water, if desired, to remove traces of unreacted phosphorus pentoxide.

A preferred procedure usable in many instances is to burn a mixture of powdered phosphorus, preferably red phosphorus, and air or oxygen, preferably oxygen, either with or without other combustible gases, such as hydrogen and acetylene, in a welder's torch or its equivalent and to play the oxyphosphorus flame produced on the surface which it is desired to glaze, care being taken to be sure that the non-reducing portion of the flame contacts the surface. Under such conditions the surface can be heated rapidly to the required temperature, even when replying entirely upon the heat of combustion of the phosphorus, and the glaze is formed even though heating of the article below the surface is kept at a minimum. Both ceramic articles and oxide-coated metal articles have been surface treated satisfactorily using such an oxyphosphorus torch. In a further modification, powdered phosphorus pentoxide can be fed through a torch burning a conventional combustible gas so that it is vaporized in the flame and the vapors projected against the surface of the article. For "touch-up" and other miscellaneous small jobs phosphorus pentoxide can sometimes be satisfactorily dusted or sprinkled into the flame of a torch or ordinary gas burner with the flame playing on the surface to be glazed.

In connection with the oxyphosphorus torch just referred to, which has not been described previously, it is important to point out that the torch can also be used successfully for welding metals and alloys, such as aluminum, cast iron, magnesium and others, which are difficult to weld in a conventional manner without taking special precautions to prevent the formation of oxides within the region of the weld. This is accomplished conveniently using the oxyphosphorus torch by positioning the torch so that the reducing portion of the flame plays upon the surface to be heated. Due to the fluxing action of the phosphorus pentoxide on the metal oxides, and probably to the strong reducing action of heated but unburned phosphorus in the reducing region of the flame when elemental phosphorus is used, a clean, unoxidized heated surface of the metal is maintained up to its point of fusion. When two such pieces having fused surfaces are pressed together and allowed to cool, a strong weld is produced. This welding technique has not been described previously.

A modification of the welding technique just described useful in many instances comprises placing cold powdered phosphorus pentoxide, e. g., by sprinkling, dusting or blowing, on heated metal surfaces which are to be joined. The phosphorus pentoxide is vaporized instantly furnishing a high concentration of vapor in intimate contact with the heated surface which instantly forms a flux with any metal oxide on the surface giving a clean bright surface suitable for welding or soldering. Phosphorus pentoxide which has absorbed traces of moisture appears to be of particular value in such applications. When metals or alloys having different melting points are to be joined, joining is effected readily when both metal surfaces are heated only to the approximate fusing temperature of the lower-melting metal, the process thus being adapted to soldering as well as welding. Welding rods containing a core of phosphorus pentoxide permit the adaptation of the process to electric welding. Using the process, copper and aluminum have been bonded firmly to steel.

The actual temperature to which the surface of the high-melting substance is heated to effect glazing by contacting it with phosphorus pentoxide vapor will, of course, depend to a considerable extent upon the chemical nature of the substance. Copper sheet, for example, can be glazed satisfactorily, although slowly, at temperatures as low as about 480° F. while refractory substances, particularly those high in zirconia, may require a temperature within the range of about 1500° to about 2600° F. for rapid formation of the glaze. Generally speaking, most metals are glazed satisfactorily at about a dull red heat or somewhat below. Metal carbides, such as titanium carbide or chromium carbide, bonderized with metal powders can be satisfactorily glazed at temperatures between about 1000° and 2000° F.

It has been noted, particularly in the case of metals which oxidize relatively easily at elevated temperatures, that there appears to be a correlation between the temperature employed and the adherent qualities and other properties of the glaze as well as the rate at which the latter is formed. In the case of copper, for example, it is difficult to obtain an adherent glaze at temperatures much below about 450° to 480° F. even though a glaze can eventually be formed at such temperatures. Glazes formed at such low temperatures are often subject to attack and disintegration by water vapor of the air. When the temperature employed is about 480° F. or somewhat higher, the glaze which is formed more rapidly is of satisfactory quality, is unattacked by moisture and adheres tightly to the surface. Properly treated sheets can be bent and formed to some extent using smooth dies without appreciable injury of the glaze. When, however, the temperature employed approaches the melting point of copper the rate of oxidation appears to be so rapid compared with the rate of glaze formation that a layer of unreacted and loosely adherent oxide is formed between the metal surface and the glaze and, more particularly, that the minute pores in the metal become filled with oxide and thus prevent their being filled with the glaze which, under more favorable conditions, serves to anchor the glaze to the surface at many closely spaced points. As a result, the glaze which is formed at such high temperatures, although often of a satisfactorily impervious and chemically resistant nature, leaves much to be desired in the way of adherence.

It appears, also, that there may be some correlation between the character of the glaze formed and the proportion of phosphorus pentoxide and free oxygen in the gas mixture which contacts the surface of easily oxidized metals although the importance of this factor is believed to be of minor significance in comparison to the effects of temperature just described. Generally speaking, surface temperatures should be employed which are sufficiently high to volatilize all liquid substances and to roast out graphitic and carbide carbon and sulfur as well as to convert manganese and other scavenger metals to their higher states of oxidation and to oxidize combined silicon to silica.

Inasmuch as the effective glazing of a metal or alloy appears to depend upon the previous or concurrent formation on the metal surface of a tightly adherent oxide film which reacts with the phosphorus pentoxide vapor to form the glaze, it is apparent that in such cases non-reducing conditions should be maintained in the region of glaze formation. Since the operation if often effected in the presence of moist air or oxygen this is automatically taken care of in such instances without special precautions. When, however, glazing is effected using the oxyphosphorus torch it is apparent that contact of the surfaces which are to be glazed with the reducing portions or regions of the flame should be avoided as much as possible. It is pointed out, also, that metals which are ordinarily not considered to have an appreciable film of oxide on their surface, can, nevertheless, be glazed under non-reducing conditions. This is thought to be due to the preliminary formation at the higher temperatures employed of a tightly adherent oxide film on the surface which then reacts with the phosphorus pentoxide vapor. For this reason it appears advisable in the case of certain metals, such as nickel, silver and stainless steel, to adjust the glazing temperature so that the glaze will be built up relatively slowly and every opportunity given for the formation of a suitable preliminary oxide coating. The formation of an oxide coating is often facilitated by increasing the proportion of oxygen or water vapor in the gas mixture over that normally resulting from the use of air in combusting the phosphorus.

In the case of most ceramic materials, such as those high in alumina, zirconia, zirconium silicate, barium or calcium zirconium silicates and the like, glaze formation occurs readily even under mild reducing conditions and the maintenance of non-reducing conditions in such instances is of less importance than in the case of the glazing of metals.

When preparing the new glazed combustion tube referred to, a ceramic tube, prepared in conventional manner, is chosen having a softening temperature higher than the temperature at which subsequent analyses using the tube are to be carried out. Such tubes usually have a relatively low content of a binder, such as ball clay or other siliceous material. As an illustration, tubes containing from about 8 to about 15 per cent by weight of silica, derived from clay used as a bonding agent, and alumina or zirconium silicate have been used with entire satisfaction. Such tubes are conducive to the formation of a hard glaze which is substantially non-softening at the combustion temperatures employed. Tubes in which the refractory contains a low proportion of zirconium silicate, zirconium oxide, calcium zirconium silicate, barium zirconium silicate or the corresponding aluminates and mixtures thereof can also be used with satisfaction. A certain degree of porosity in the tube is not objectionable because the glazing process effectively seals all pores in the wall of the tube unless they are of exceptionally large diameter as might be the case in a poorly made non-uniform tube. Although the dimensions of the tube are not critical, tubes having an internal diameter of about 1.0 inch, a wall thickness of about ⅛ inch and a length of about 20 to 24 inches have been found satisfactory in most instances and can be used in the conventional furnace.

In certain instances ceramic tubes having pores in the walls too large to be coated over continuously by the glaze can be treated before glazing to render them more satisfactory. One such treatment consists in filling the tube with an aqueous suspension of a finely divided refractory substance, such as aluminum oxide or zirconium oxide, and causing water to exude outwardly through the pores in the tube wall. Under such conditions the pores become packed with the refractory substance. The tube can then be dried and glazed as previously described, the packing in the pores being effectively cemented therein during the heating step involved.

The glazing of the ceramic tube can be carried out conveniently by heating it in a furnace, preferably at a temperature of about 2100 degrees to about 2500 degrees F. or higher, and burning or combusting elemental phosphorus in a current of air or oxygen flowing through the tube. Either red or yellow phosphorus can be used although red phosphorus is preferred because of its more favorable physical properties and because it is less easily oxidized at temperatures below the glazing temperature. The operation is carried out conveniently by heating the unglazed tube, e. g. in a furnace, and, after placing the phosphorus in the heated portion of the tube, passing a current of air or oxygen rapidly through the tube. The phosphorus burns rapidly and phosphorus pentoxide fume or smoke issues from the end of the tube. When all the phosphorus has burned the tube is allowed to cool after which the inner surface of the tube wall is found to be coated with a thin, impervious, smooth glaze. Any phosphorus pentoxide adhering to the tube wall can be removed by heating in vacuo or by washing carefully with water. Although the exact chemical composition of the glaze formed on the wall of the tube is not known at the present time, it is thought that at the glazing temperature the phosphorus pentoxide formed during the burning of the phosphorus combines with the constituents of the tube wall to form a thin coating of a phosphate or pyrophosphate, e. g. of calcium, aluminum, barium or zirconium, or even of mixed phosphates or pyrophosphates, and that the coating is sufficiently soft and fluid at the glazing temperature to seal the pores in the tube wall and to coat the wall with a continuous film so that only the phosphate glaze comes in contact with gases passing through the tube. The phosphate glaze does not appear to be a catalyst for the reaction between oxygen and sulfur dioxide to form sulfur trioxide. It may be, also, that a certain proportion of the elemental phosphorus is vaporized and is contacted in elemental form with the hot tube wall. However, little or no vapors of elemental phosphorus occur in the exit gases from the tube. Regardless of the reason or mechanism, combustion procedures for the determination of sulfur can be carried out in the tube and the sulfur swept from the heated portion of the tube in the current of exhaust gases quantitatively in the form of sulfur dioxide.

From the foregoing description, it is apparent that the tube wall need be glazed only on its inner surface and only along the portion which is heated during a combustion procedure. It is, however, not disadvantageous that other portions of the tube wall be glazed and in the case of particularly porous tubes it is advisable to glaze the entire length of the inner surface to prevent gas leakage through the pores. It is apparent also that glazing, when the process is carried out as described, occurs mainly in the portion of the tube lying adjacent to and downstream, with respect to the direction of the gas flow, from the phosphorus burning in the tube. It is advantageous to place the phosphorus well within the heated portion of the tube to promote its ignition and rapid combustion. For these and other reasons, it is generally advisable that a section of the tube be glazed which is at least longer than the section which is heated when the tube is used in determining sulfur quantitatively.

If desired, the glazing can also be carried out by dusting the tube surface carefully with phosphorus pentoxide and then heating it, or passing a current of air or oxygen and phosphorus vapors, or of phosphorus pentoxide suspended in a current of oxygen, air or inert gas, through the heated tube. Other ways of contacting phosphorus pentoxide with the heated tube will be apparent to those skilled in the art. Other phosphorus compounds, such as phosphorus halides, oxyhalides, sulfides and the like, which are reactive with the heated tube surface to form a phosphorus-containing glaze thereon can be used, if desired.

Although the glazing temperature will depend somewhat on the composition of the particular tube being glazed, it should be high enough to render the glaze sufficiently fluid or plastic to form a continuous coating on the tube wall. However, the tube should be chosen so that the glaze which is formed will not be soft or sticky at the combustion temperature of the sulfur-containing sample, e. g. at from about 2000 degrees to about 2400 degrees F.

Although furnace temperatures of from about 2100 degrees to about 2500 degrees F., or higher, are usually maintained during the glazing operation, it may be that during the burning of the phosphorus in the tube the inner surface of the tube wall is heated for a very short time to a considerably higher temperature and that the actual glazing temperature is considerably higher than the furnace temperature as it is known that the reaction of phosphorus with oxygen is highly exothermic. It appears, also, that when phosphorus pentoxide or other phosphorus compound which does not burn exothermically during the process is used, somewhat higher furnace temperatures are advisable. Such higher temperatures can be employed without deforming or otherwise harming the ceramic tube because the heating period need only be of short duration.

When the glaze is of such a nature that it softens at the temperature employed during combustion, it frequently happens that certain substances formed during the combustion of the sulfur-containing sample, e. g. iron oxide in the case of the combustion of iron or steel samples, adhere to the softened surface and catalyze the formation of sulfur trioxide in the hot gaseous mixture during subsequent determinations. Such tubes can often be "re- "vivified" by re-glazing them in substantially the manner described. To provide a glaze with a high softening point, it is, as mentioned previously, advisable to use a tube having a relatively high content of refractory substances and a relatively low content of silica or other binder.

When desired, the character of the glaze can be modified by the addition of silica, zirconia, magnesia, alumina and other substances, generally by dusting or coating them in powdered form on the hot surface during or following the formation of the glaze. The resistance of the surface to corrosion or abrasion under specific conditions is often thereby increased. Effective ceramic coatings can be built up on metals using this technique. Thicker ceramic coatings can often be built up on metals by glazing the metals and then, after cooling, coating it with a thin layer of a ceramic powder and firing the coated article at a temperature below the melting point of the metal. The final firing can often be accomplished with a torch. Laminated coatings of ceramics can, if desired, be built up on the surfaces of articles by successive applications of the modification just described using first one powdered ceramic material and then another. In this manner a high alumina porous ceramic tube has been glazed and coated on its inner surface first with a layer of zirconium silicate, then with zirconium oxide to effectively seal and glaze the tube. Colored additives, e. g. certain metal oxides or salts, can be added in like manner to produce colored glazes.

Articles glazed according to the method of the invention have numerous advantages. It has been pointed out previously that the glaze appears to be less catalytic for the conversion of sulphur dioxide to sulphur trioxide than do unglazed surfaces of ceramic substances generally used in making combustion tubes. Sulphur-burning furnaces can be constructed of suitable refractory brick laid up with suitable high-temperature cements and the entire inside of the furnace glazed by burning red phosphorus in it after pre-heating with hot gases. Sulphur burned continuously in such a furnace yields sulphur dioxide containing a minimum of sulphur trioxide. Such furnaces produce sulphur dioxide of a quality particularly desirable in the paper industry where the presence of a significant proportion of sulphur trioxide is to be avoided, if possible.

Furthermore, due to the sealing action of the glaze, the process can be employed to advantage in the treatment of brick, clay-coated cement blocks, granite, slag blocks and the like used for construction of all kinds to water-proof them and render them substantially impervious to gas diffusion. The treatment of brick can be carried out conveniently by introducing phosphorus pentoxide into the kiln, or by burning red phosphorus in the kiln, at the end of the firing period before the bricks have cooled. Articles having large pores or blow-holes, such as poured blocks of blast furnace slag, can often first be smoothed over with a firing cement, such as powdered alumina or silica mixed with a clay binder, and after firing glazed as herein described.

A particular advantage accruing to the glazing of metals and alloys using the process of the invention is that the glaze forms an excellent base for the subsequent anchoring of vitreous enamels to the metal surface. Aluminum bathtubs, wash basins, and the like can be glazed and subsequently enameled using conventional vitreous enamels and procedures. Metals and alloys glazed according to the method of the invention are highly resistant to corrosion under acid, alkaline and neutral as well as under reducing and oxidizing conditions. Glazed aluminum, for example, is highly resistant to the action of sea water and iron and steel resist rusting in humid atmospheres. Certain metal bearing surfaces can often be glazed to advantage. The ignition of easily combustible metals, such as aluminum or magnesium, at or near their melting point is either prevented entirely or retarded greatly by the glaze.

A further utility of the process resides in the building up of laminated refractory or ceramic articles from thin sheets which have been glazed on each side. A number of such sheets can be piled on one another and heated under compressive pressure to "sweat" the sheets together. Such an article is of value in applications, such as turbine blades and the like, where it is subject to repeated and rapid temperature changes. Due to the somewhat plastic nature of the glaze, a certain amount of slippage of the surface of one sheet along that of an adjoining sheet can take place without breaking or cracking the laminated structure. This compensates for differential expansion between the inner and outer portions of the article occasioned by rapid and wide variation in temperature to which the outer surface of the article may be subjected. In addition, the presence of a multiplicity of layers of the glaze in the laminated article prevents almost completely the diffusion of gases into the body of the laminated article and reduces materially the danger of its explosive rupture due to the pressure of occluded gases at very high temperatures.

Certain advantages are apparent from the following examples which are given by way of illustration only and are not to be construed as limiting.

*Example 1*

A ceramic tube formed from a refractory and clay mixture comprising about 88 per cent of aluminum oxide and about 12 per cent of silicon dioxide, was heated to about 2250° F. in an electric furnace. The tube had a ⅛ inch wall and an inside diameter of one inch and was about 24 inches long. About 6 inches of each end of the tube protruded from the furnace and was not heated. A combustion boat containing about 2 grams of red phosphorus was placed in one end of the tube just inside the heated zone and the boat tipped over. A gentle stream of oxygen was then passed into the end of the tube containing the phosphorus and allowed to issue from the other end. The phosphorus burned rapidly and dense clouds of phosphorus pentoxide issued from the tube. When phosphorus pentoxide was no longer observed in the gas stream, the tube was cooled slowly, washed inside with distilled water and dried. The inside of the tube was found to be coated with a mirror-like, non-porous and continuous glaze over the surface which had been heated. The sections of the tube which were not heated were not glazed.

The tube was then replaced in the furnace and heated to about 2100° F. A combustion boat was charged with a one gram sample of finely divided cast iron containing 0.090 per cent by weight of sulfur (National Bureau of Standards No. 107). The sample was covered with a thin sheet of copper in conventional manner and the boat placed just inside one end of the heated portion of the tube.

A slow stream of oxygen was passed through the tube from the end containing the boat. The sample burned brilliantly in the combustion boat, the stream of oxygen being continued for several minutes after the combustion appeared to be complete. The sulfur dioxide in the exit gases was titrated with standardized iodine solution in conventional manner. In this way 0.090 gram of sulfur, or 100 per cent of that present in the sample of cast iron, was accounted for by calculation from the amount of iodine consumed.

Similar results are obtained when using the glazed tube in the analysis of alloy steels and other sulfur-containing substances from which the sulfur is liberated as sulfur dioxide upon combustion.

*Example 2*

Numerous small samples of various articles were glazed in a tubular, electrically heated furnace equipped for the passage of a slow current of oxygen continuously through it. A small ceramic boat for containing red phosphorus was positioned within the end of the heated zone of the furnace nearest the air inlet, the sample to be glazed being positioned a little farther inside the heated zone. In operation, the temperature of the furnace was adjusted to the desired value and the sample was placed in position and allowed to come to temperature. The boat containing several grams of red phosphorus was then slid into position and the end of the furnace was connected with the source of oxygen. Rapid combustion of the phosphorus occurred, a dense cloud of phosphorus pentoxide fumes issuing from the end of the furnace opposite the air supply. After the issuance of fumes had ceased, the treated sample was slid into an unheated portion of the furnace and allowed to cool. It was subsequently washed with water, dried and examined. In this way, samples of the following substances were glazed at approximately the temperatures indicated:

| Substance Glazed | Approximate Glazing Temperature, °F. |
| --- | --- |
| Cast iron | 750–1,000 |
| Aluminum | 700– 900 |
| Silicon carbide (Carborundum) | 1,750–2,000 |
| Silicon carbide (coated with an alumina-clay mixture) | 1,750–2,000 |
| Titanium carbide (bonderized with iron powder) | 1,300–1,600 |
| Blast furnace slag | 1,500–1,800 |
| Blast furnace slag (coated with a thin layer of an alumina-clay mixture) | 1,500–1,700 |

In each instance the article after removal from the furnace was found to be glazed over its entire surface except where it had contacted the furnace wall. The glaze was extremely adherent and in most instances could not be removed by scraping with a knife blade. The glaze on smooth surfaces of the articles was itself smooth and shiny. Minute pores in the surfaces of the articles were filled substantially with glaze and larger pores were glazed over their entire inner surfaces. The cast iron and steel samples were exceptionally resistant to rusting in humid atmospheres and the aluminum sample was not corroded upon long contact with dilute salt solution. The blast furnace slag, which before glazing was quite porous and contained numerous blow-holes and absorbed a considerable proportion of its weight of water when immersed in water, was found to be glazed over its entire surface in such a manner that the absorption of water was very low.

*Example 3*

Small samples of a number of articles were glazed by directing the oxidizing zone of an ordinary gas flame against a surface of the article while sprinkling phosphorus pentoxide into the flame. The progress of the formation of a suitable glaze was judged visually. Substances which were thus glazed satisfactorily using this procedure are given below. The temperatures of the surfaces during the glazing operations were not measured accurately, the indicated glazing temperature given below being estimated roughly on the basis of previous experience and the duration of the heating period compared with that required to produce dull red heat.

| Substance Glaced | Estimated Glazing Temperature, °F. |
| --- | --- |
| Steel | 450– 800 |
| Copper | 450– 700 |
| Brass | 450– 700 |
| Tin | 450– 700 |
| Stainless steel | 800–1,000 |
| Nichrome | 800–1,000 |
| Kanthal (aluminum-nickel-chromium alloy) | 800–1,000 |
| Silver alloy (90 percent silver-10 percent copper) | 650– 850 |
| Blast furnace slag | 900–1,200 |
| Blast furnace slag (coated with a thin layer of an alumina-clay mixture) | 900–1,200 |
| Blast furnace slag (coated with a thin layer of infusorial earth) | 900–1,200 |

In each instance a tightly adherent, shiny glaze was formed on the surface.

*Example 4*

A conventional welder's torch was modified so that a mixture of oxygen and powdered red phosphorus could be fed to the torch through the lines normally used for feeding gases. The torch produced a hot flame when the issuing mixture of phosphorus powder and oxygen was ignited. This torch was used for glazing samples of substances by playing the outer end or oxidizing portion of the flame on the surface of the substance. The formation of a suitable glaze on any given part of the surface was judged visually and when a sufficient glazing of the area being heated had occurred the flame was moved to an adjoining area. No attempt was made to measure the temperature of the flame or of the heated surface, but it was observed that metals could be heated to red heat and even to their fusion points rapidly and without difficulty. In this manner suitable glazes were formed on surface areas of cast iron, blast furnace slag coated with an alumina-clay mixture, titanium carbide bonderized with iron powder, lithium aluminum silicate and other substances.

*Example 5*

The flame of the oxyphosphorus torch referred to in Example 4 was directed on to two closely spaced surfaces of separate pieces of cast iron. In this instance the torch was held so that the inner portion or reducing area of the flame played on the surfaces. When the two surfaces had reached incipient fusion and had softened they were pressed together and held under considerable tension until they had cooled. A strong weld was thus obtained.

Pieces of aluminum were welded together using a substantially similar technique.

*Example 6*

A piece of aluminum was glazed on one of its surfaces using an oxyphosphorus torch according to the method described in Example 4. The piece was cooled and a portion of the glazed surface was coated with a slurry of low-melting clay and the piece dried. The coated piece was then fired at a temperature just below the melting point of the aluminum and cooled. The piece was found to be coated with an adherent layer of partially fused clay bonded firmly to the metal. When the firing was carried out using the oxyphosphorus torch the ceramic coating was glazed over its outer surface.

*Example 7*

Surfaces of steel and aluminum articles were heated to the melting point of the aluminum and both surfaces sprinkled liberally with phosphorus pentoxide. The two surfaces were then pressed firmly together to squeeze fluid flux from between them and cooled with the clean surfaces in compressive contact. Welding of the aluminum to the steel was thus effected. In a similar manner the welding of copper to steel was effected.

*Example 8*

A porous combustion tube having a high content of alumina was heated at between about 2100° and about 2500 F. in an electric furnace and a current of air containing suspended phosphorus pentoxide and finely powdered zirconium silicate was passed through it for several minutes. This was followed by a current of air containing suspended phosphorus pentoxide and zirconium oxide powder. The tube was finally cooled slowly. The inner surface which had been heated was coated with a glaze containing a high proportion of particles of zirconium silicate and zirconium oxide in substantially separate but thoroughly fused layers. The glazed portion of the tube wall was impervious to gases.

We claim:

1. The method for protecting and sealing a surface which includes the step of contacting a surface consisting essentially of an inorganic metal compound melting above about 480° Fahrenheit with phosphorous pentoxide vapor at a temperature above about 480° Fahrenheit to form an adherent continuous protective glaze on the surface thereof.

2. The method of claim 1 wherein the surface is the surface of a formed article.

3. The method of claim 1 wherein the contacting step is carried out under non-reducing conditions.

4. The method for protecting and sealing the surface of a substance melting above about 480° Fahrenheit and having a surface comprising an inorganic metal compound melting above about 480° Fahrenheit which includes the step of contacting the surface of the substance at a temperature above about 480° Fahrenheit with phosphorus-pentoxide vapor.

5. The method for forming an adherent continuous deposit on the surface of a substance melting above about 480° Fahrenheit whose surface comprises an inorganic metal compound melting above about 480° Fahrenheit which includes the steps of heating at least the surface of the substance at a temperature between about 480° Fahrenheit and the melting point of the substance and contacting the heated surface with phosphorus pentoxide vapor.

6. The method of claim 5 wherein the surface melts not lower than about 2600° Fahrenheit and the contacting with phosphorus pentoxide vapor is effected at a temperature between about 2100° and 2500° Fahrenheit.

7. The method for glazing the inner surface of a ceramic tube which includes: heating a ceramic tube at a temperature of at least about 2100° Fahrenheit; and contacting the surface of the heated tube with phosphorus pentoxide.

8. The method of claim 7 wherein the ceramic tube comprises zirconium silicate and from about 8 to about 15 per cent by weight of uncombined silica.

9. The method for coating the inner surface of a ceramic tube which includes: heating a ceramic tube comprising a highly refractory substance and not to exceed from about 8 to about 15 per cent by weight of silica at a temperature of at least about 2100° Fahrenheit; and combusting elemental phosphorus within the tube thereby to effect contact of phosphorus pentoxide with the heated tube wall.

10. The method for protecting and sealing a surface which includes the step of contacting the surface of an oxide-coated metal melting above about 480° Fahrenheit with phosphorus pentoxide vapor at a temperature between about 480° Fahrenheit and the melting point of the metal to form an adherent continuous protective glaze on the surface thereof.

11. The method for protecting and sealing a surface which includes the step of contacting the surface of an oxidizable metal with melting above about 480° Fahrenheit with oxygen at a temperature above about 480° Fahrenheit to form an oxide deposit thereon and substantially simultaneously contacting the oxide-coated surface with phosphorus pentoxide vapor at substantially the same temperature to form an adherent continuous protective deposit on the surface.

12. An inorganic substance melting above about 480° Fahrenheit having on its surface an adherent, continuous, protective glaze formed by contacting the surface of the substance heated at a temperature above about 480° Fahrenheit with phosphorus pentoxide vapor.

13. A formed article comprising an inorganic composition melting above about 480° Fahrenheit and having on at least a portion of its surface an adherent, continuous, protective glaze formed by contacting the surface of the article heated at a temperature between about 480° Fahrenheit and the melting point of the composition with phosphorus pentoxide vapor.

14. An article as claimed in claim 13 wherein the composition is a wholly inorganic metal compound.

15. A ceramic tube having on at least a portion of its inner wall surface an adherent, continuous glaze formed by contacting the surface heated at a temperature of at least about 2100° Fahrenheit with phosphorous pentoxide vapor.

16. A formed article melting above about 480° Fahrenheit comprising an oxide-coated metal and having on at least a portion of its surface an adherent, continuous protective glaze formed by contacting the surface of the article heated at a temperature between about 480° Fahrenheit and the melting point of the metal with phosphorous pentoxide vapor under non-reducing conditions.

References Cited in the file of this patent

UNITED STATES PATENTS

| Number | Name | Date |
|---|---|---|
| 1,456,252 | Peacock | May 2, 1923 |
| 1,752,792 | Hageman | Apr. 1, 1930 |
| 2,170,387 | Morgan | Aug. 22, 1939 |
| 2,232,462 | Lower | Feb. 18, 1941 |
| 2,248,432 | Lower | July 8, 1941 |
| 2,281,167 | Nichols | Apr. 28, 1942 |